US010423625B2

(12) United States Patent
Datta et al.

(10) Patent No.: US 10,423,625 B2
(45) Date of Patent: Sep. 24, 2019

(54) EXACTLY-ONCE SEMANTICS FOR STREAMING ANALYTICS IN NON-IDEMPOTENT OUTPUT OPERATIONS

(71) Applicant: SAMSUNG SDS AMERICA, INC., Ridgefield Park, NJ (US)

(72) Inventors: Partho Datta, Pleasanton, CA (US); Girish Kathalagiri Somashekariah, Santa Clara, CA (US)

(73) Assignee: SAMSUNG SDS AMERICA, INC., Ridgefield Park, NJ (US)

( * ) Notice: Subject to any disclaimer, the term of this patent is extended or adjusted under 35 U.S.C. 154(b) by 337 days.

(21) Appl. No.: 15/290,751

(22) Filed: Oct. 11, 2016

(65) Prior Publication Data

US 2017/0103108 A1    Apr. 13, 2017

Related U.S. Application Data

(60) Provisional application No. 62/238,812, filed on Oct. 8, 2015.

(51) Int. Cl.
G06F 16/00    (2019.01)
G06F 16/2455    (2019.01)
G06F 9/448    (2018.01)
G06F 9/445    (2018.01)
G06F 11/07    (2006.01)

(52) U.S. Cl.
CPC ........ G06F 16/24568 (2019.01); G06F 9/448 (2018.02); G06F 9/44521 (2013.01); G06F 11/0709 (2013.01); G06F 11/0793 (2013.01)

(58) Field of Classification Search
CPC .. G06F 17/30516; G06F 9/448; G06F 9/4421; G06F 9/44521; G06F 11/0793; G06F 16/24568; G06F 8/44521; G06F 11/0709; G06F 11/07
USPC ........................................................ 707/741
See application file for complete search history.

(56) References Cited

U.S. PATENT DOCUMENTS

| 2011/0141122 A1* | 6/2011 | Hakura ..................... G06T 1/00 345/505 |
| 2014/0280766 A1* | 9/2014 | Banerjee ................. H04L 65/60 709/219 |
| 2015/0134626 A1* | 5/2015 | Theimer ............. G06F 11/1469 707/693 |
| 2017/0063659 A1* | 3/2017 | Platon ..................... H04L 45/20 |
| 2017/0075721 A1* | 3/2017 | Bishop ................. G06F 9/4881 |

* cited by examiner

*Primary Examiner* — Thanh-Ha Dang
(74) *Attorney, Agent, or Firm* — Sughrue Mion, PLLC

(57) ABSTRACT

An approach for distributed stream computing in non-idempotent output operations is provided. The approach assigns an eventid to a corresponding entityid. The approach determines a minibatchid and a partitionid for a partition. The approach determines whether the partition was previously processed. The approach generates a new minibatchid and a new partitionid for a new partition based upon determining the partition was not previously processed. The approach determines whether a record was previously processed based upon determining the partition was previously processed. The approach processes the record of the partition based upon determining the record was not previously processed.

20 Claims, 4 Drawing Sheets

EXACTLY-ONCE SEMANTICS FOR STREAMING ANALYTICS IN NON-IDEMPOTENT OUTPUT OPERATIONS

BACKGROUND

This disclosure relates generally to distributed stream computing, and more particularly, to exactly-once semantic processing in non-idempotent output operations.

In distributed stream computing, a pure function is a transformation of input data to output data in which the compute logic is side effect free. Side effects may include writing out a message to another distributed bus or writing a value to a key value store during a computation. Side effect free code allows a cluster manager or driver to run this code again on the same compute node or perhaps another compute node. However, practical solutions, in distributed stream computing, typically contain side effects and, therefore cannot always be based on pure functions.

A typical operation in a distributed stream computing system takes a period of time (e.g. a minute, a year, etc.) to complete. During this period, several faults or losses may occur within the distributed computing environment. In a first example, a fault may occur when there is a power failure in one or more compute nodes. In a second example, a fault may occur where a batch of compute nodes are considerably faster than another batch. A system may determine the faster batch of compute nodes completed running the operation while the slower batch of compute nodes are still running or waiting to run the operation, in which the system might perform a speculative execution on the faster compute nodes.

Generally, distributed data transformation frameworks provide fault-tolerance mechanisms to recover from compute node faults. These mechanisms can provide exactly-once semantics for the idempotent transformations, but some output operations performed after the transformations have at-least once semantics.

In a typical fault-tolerance mechanism, when a compute node fails within a cluster of compute nodes, the system may automatically reapply transformations, using a distributed key value data store or a distributed messaging system, to replicated data sets and compute the input partition again on either the same compute node or another compute node. However, this recovery mechanism results in replaying the input data, thereby duplicating the output data and corrupting the state of the application. As a result of the duplicated coordination messages, the system performs duplicate message processing and produces erroneous results.

For idempotent operations, at-least once semantics is sufficient, but there are scenarios in which the output operation might involve message sending or some other non-idempotent action. In such scenarios, an extension to the original fault-tolerance mechanism that avoids duplication of output operations is necessary to achieve exactly-once semantics.

SUMMARY

In some exemplary embodiments a distributed stream computing method in non-idempotent output operations, implemented by one or more processors, includes: assigning an eventid to a corresponding entityid; determining a minibatchid and a partitionid for a partition; determining whether the partition was previously processed; generating a new minibatchid and a new partitionid for a new partition based upon determining the partition was not previously processed; determining whether a record was previously processed based upon determining the partition was previously processed; and processing the record of the partition based upon determining the record was not previously processed.

In other exemplary embodiments, a distributed stream computing apparatus in non-idempotent output operations includes: at least one memory operable to store program instructions; at least one processor operable to read the stored program instructions; and according to the stored program instructions, the at least one processor is configured to be operated as: a driver configured to assign an eventid to a corresponding entityid, to determine a minibatchid and a partitionid for a partition, to determine whether the partition was previously processed, to generate a new minibatchid and a new partitionid for a new partition based upon determining the partition was not previously processed, and to determine whether a record was previously processed based upon determining the partition was previously processed; and one or more compute nodes configured to process the record of the partition based upon the driver determining the record was not previously processed.

In yet other exemplary embodiments, a non-transitory computer readable storage medium, implemented by one or more processors, storing traffic segmentation program for causing a computer to function as: a driver configured to assign an eventid to a corresponding entityid, wherein the eventid comprises a monotonically increasing event value, to determine a minibatchid and a partitionid for a partition, to determine whether the partition was previously processed, to generate a new minibatchid and a new partitionid for a new partition based upon determining the partition was not previously processed, and to determine whether a record was previously processed based upon determining the partition was previously processed; and one or more compute nodes configured to process the record of the partition based upon the driver determining the record was not previously processed.

DETAILED DESCRIPTION

Exemplary embodiments of the present invention relates generally to distributed stream computing, and more particularly, to exactly-once semantic processing in non-idempotent output operations. Exemplary embodiments recognize that duplication of output operations occur when a system, using a typical fault-tolerance mechanism, automatically replays a non-idempotent action for specific data items in a distributed data set partition. However, exemplary embodiments for exactly-once semantics for streaming analytics in non-idempotent output operations are described below with references to FIGS. 1-4.

Implementation of such exemplary embodiments may take a variety of forms, and exemplary implementation details are discussed subsequently with reference to the Figures.

Figure 1:
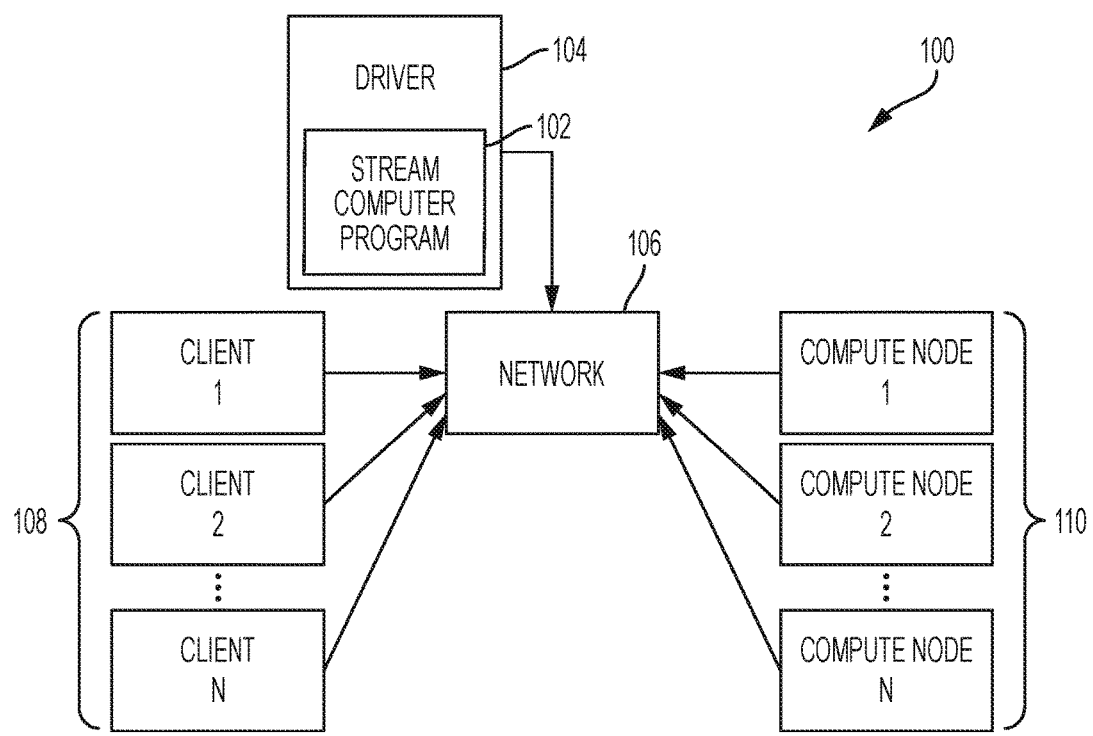
FIG. 1 is a functional block diagram illustrating a distributed computing environment, according to an exemplary embodiment.

FIG. 1 is a functional block diagram illustrating a distributed computing environment 100, according to an exemplary embodiment. FIG. 1 provides only an illustration of one implementation and does not imply any limitations with regard to the environments in which different embodiments may be implemented. Many modifications of the depicted environment may be made by those skilled in the art without departing from the scope of the invention as recited by the claims. In some embodiments, the distributed computing environment 100 includes a network 106, a driver 104, which operates stream computing program 102, one or more clients 108, and one or more compute nodes 110.

Network 106 interconnects driver 104, one or more clients 108, and one or more compute nodes 110. In general, network 106 can be any combination of connections and protocols capable of supporting communication between driver 104, one or more clients 108, one or more compute nodes 110, and stream computing program 102. In some exemplary embodiments, network 106 can be a message bus. In an exemplary embodiment, stream computing program 102 implements network 106, using a cluster of compute nodes, to scale to handle larger message rates. Network 106 can include wire cables, wireless communication links, fiber optic cables, routers, switches, firewalls, or any combination that can include wired, wireless, or fiber optic connections known by those skilled in the art.

In some exemplary embodiments, driver 104 hosts stream computing program 102. In one exemplary embodiment, driver 104 can be any programmable electronic device or computing system capable of receiving and sending data, via network 106, and performing computer-readable program instructions known by those skilled in the art. In an exemplary embodiment, driver 104 can be a central server. In some exemplary embodiments, driver 104 can include a storage database 300 (shown in FIG. 3) for storing data including, but not limited to, EntityIDs, EventIDs, MinibatchIDs, PartitionIDs, sets of EventIDs, a Counters Table, a Streams Table, and an Events Table. In an exemplary embodiment, Storage Database 300 can also store minibatches and partitions. Storage Database 300 can be any programmable electronic device or computing system capable of receiving, storing, and sending files and data, and performing computer readable program instructions capable of communicating with driver 104, one or more clients 108, and one or more compute nodes 110, via network 106. In an exemplary embodiment, driver 104 can be a coordinator or orchestrator for the one or more compute nodes 110. In some exemplary embodiments, driver 104 can be a cluster of compute nodes, in the distributed system, operating stream computing program 102, via network 106. In an exemplary embodiment, stream computing program 102 includes databases (not shown) that provide a service to external systems. In an exemplary embodiment, stream computing program 102 resides locally on driver 104. In yet other exemplary embodiments, stream computing program 102 resides locally on one or more compute nodes 110.

In some exemplary embodiments, driver 104 includes stream computing program 102 that utilizes components in order to detect fault-tolerance roll-backs in distributed dataset partitions and to determine which elements in the partition should not be processed to avoid replaying a non-idempotent action. For example, stream computing program 102 utilizes driver 104 configured to assign an eventid to a corresponding entityid, to determine a minibatchid and a partitionid for a partition, to determine whether the partition was previously processed, to generate a new minibatchid and a new partitionid for a new partition based upon determining the partition was not previously processed, and to determine whether a record was previously processed based upon determining the partition was previously processed; and one or more compute nodes 110 configured to process the record of the partition based upon the driver 104 determining the record was not previously processed.

In some exemplary embodiments, stream computing program 102 operates on a central server, such as driver 104, and can be utilized by one or more clients 108 and by one or more compute nodes 110 via a mobile application downloaded from the central server or a third-party application store, and executed on the one or more clients 108 and one or more compute nodes 110. In some exemplary embodiments, stream computing program 102, utilizing driver 104, can route a partition of a minibatch 201 (shown in FIG. 2) to a compute node 110 using a partitioning scheme. In other exemplary embodiments, stream computing program 102 routes one or more partitions of a minibatch 201 to a compute node 110. In yet other exemplary embodiments, stream computing program 102, utilizing driver 104, coordinates the processing at one or more compute nodes 110. In an exemplary embodiment, driver 104, operating stream computing program 102, runs on a specific compute node 110 and starts tasks that are distributed across one or more compute nodes 110.

In some exemplary embodiments, one or more compute nodes 110 can provide a service that can be accessed by one or more clients 108. In an exemplary embodiment, messages from a specific user or entity of a client 108 can be processed by any of one or more compute nodes 110.

In some exemplary embodiments, a client 108 is an agent to driver 104 and can be for example, a desktop computer, a laptop computer, a smart phone, or any other electronic device or computing system, known by those skilled in the art, capable of communicating with driver 104 through the network 106. For example, client 108 may be a laptop computer capable of accessing stream computing program 102 through a network, such as network 106, and providing messages. In other exemplary embodiments, client 108 can be any suitable types of mobile devices capable of running mobile applications or a mobile operating system. In yet another exemplary embodiment, client 108 can be an intermediary, such as a website, between an end user and stream computing program 102.

In some exemplary embodiments, a compute node 110 can be any programmable electronic device or computing system capable of receiving and sending data, via network 106, and performing computer-readable program instructions known by those skilled in the art. In some exemplary embodiments, a compute node 110 can include a data storage repository (not shown) for storing data including, but not limited to, EntityIDs, EventIDs, MinibatchIDs, PartitionIDs, sets of EventIDs, a Counters Table, a Streams Table, an Events Table, store minibatches and partitions. Data storage repository can be any programmable electronic device or computing system capable of receiving, storing, and sending files and data, and performing computer readable program instructions capable of communicating with driver 104, one or more clients 108, and stream computing program 102, via network 106. In an exemplary embodiment, a compute node 110 can be a commodity server capable of failing at any time.

In some exemplary embodiments, driver 104 generates a distributed key value store and distributes a copy of the distributed key value store to the one or more compute nodes 110. In some exemplary embodiments, each compute node 110 in the cluster retains a cached copy of the distributed key value store. In other exemplary embodiments, driver 104 distributes the distributed key value store to one or more compute nodes 110.

Figure 2:
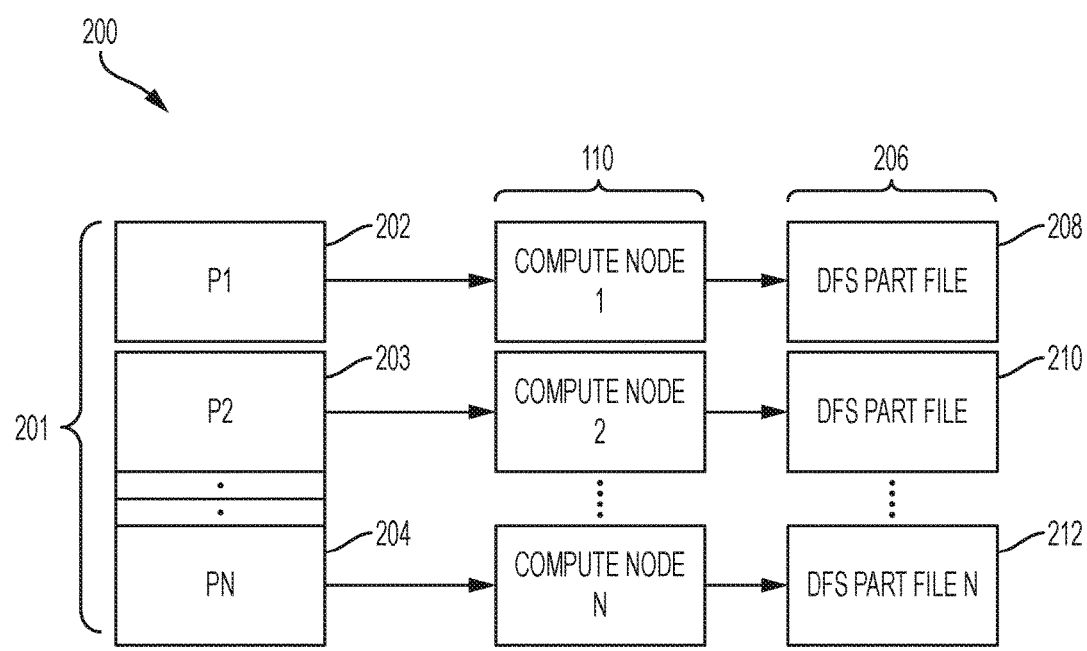
FIG. 2 is an example illustrating stream processing in a distributed computing environment, according to an exemplary embodiment.

FIG. 2 is an example illustrating stream processing in a distributed computing environment 100, according to an exemplary embodiment. FIG. 2 illustrates a distributed stream computing system that utilizes a distributed input data stream source, such as a receiver (not shown), one or more compute nodes 110, and a distributed file system directory 206 to achieve exactly-once processing semantics.

In an exemplary embodiment, a distributed input data stream source generates data from a distributed messaging system (not shown) and provides the generated data as input for the system. The input data, such as a resilient distributed dataset (RDD), may be a series of minibatches, such as minibatch 201. Each minibatch may be composed of one or more partitions, such as P1 202, P2 203, and PN 204. A partition may be a subset of records in a batch that a compute node 110 may receive and process. A record may be a collection of fields that a compute node 110 may process (e.g. first name, last name, address, department, etc.). In an exemplary embodiment, a distributed input data stream source provides reliable input data, which is not corrupted in the event of a fault (e.g. a power failure) during computation at one or more compute nodes 110.

In some exemplary embodiments, the distributed stream computing system routes the one or more partitions through one or more compute nodes 110 running a pure function. In an exemplary embodiment, the distributed stream computing system can route a partition to any one of the one or more compute nodes 110. For example, the system may route P2 203 to Compute Node 2. In another exemplary embodiment, the system can route two or more partitions to a compute node. For example, the system may route P1 202 and P2 203 to Compute Node 1.

In some exemplary embodiments, a compute node 110, running a pure function, processes one or more partitions. The distributed stream computing system stores the computed output of each partition in a Distributed File System file (i.e. a part file), such as DFS Part File 208, in Distributed File System Directory 206. The distributed stream computing system outputs the collection of all the part files.

When a compute nodes 110 faults (e.g. sustaining a power failure) during the processing period, the distributed stream computing system only partially processed the logical partition of input data for the faulted compute node 110. The system achieves exactly-once processing semantics by re-processing the computation on that partition either on the same compute node or another compute node, resulting in over-writing of the part file containing the partially processed partition.

Figure 3:
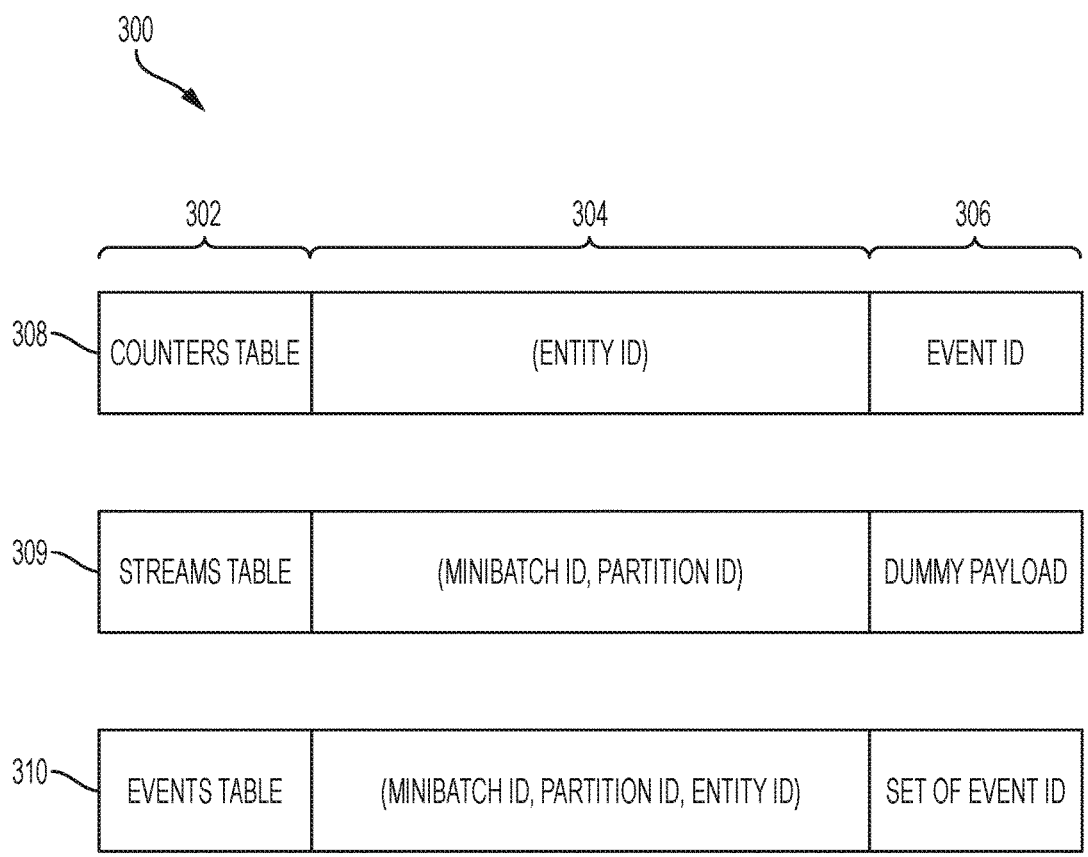
FIG. 3 is a functional block diagram depicting a storage database of a stream computing program, according to an exemplary embodiment.

FIG. 3 is a functional block diagram depicting a storage database 300 of stream computing program 102 for distributed stream processing with non-idempotent output operations, according to an exemplary embodiment. In some exemplary embodiments, storage database 300 can be located locally on stream computing program 102. In other exemplary embodiments, storage database 300 can be located remotely from driver 104 on one or more compute nodes 110. In yet other exemplary embodiments, storage database 300 may be located on a secondary distributed stream processing system.

In an exemplary embodiment, stream computing program 102 receives input messages from one or more clients 108, via network 106. In other exemplary embodiments, stream computing program 102 receives input messages from a stream computing ingress system. Stream computing system 102 dispatches output messages as a response to the request from an environment. In another exemplary embodiment, stream computing program 102 may transport messages via a web-based protocol, such as REST, into a messaging bus. Messages may refer to various activities such as the amount of time a user spends on a website or the amount of money spent by a consumer on a retailer's website. Messages, entering or exiting a distributed computing system, are called events.

In some exemplary embodiments, each event contains two identifiers such as "EntityID" and "EventID." EntityID uniquely identifies the associated entity or user (e.g. customer, prospect, etc.) that relates to the event. In an exemplary embodiment, stream computing program 102 assigns an EntityID to the entity or user. In another exemplary embodiment, an external system can assign the EntityID. EventID is an event value assigned to the event. This event value is unique, across the one or more compute nodes 110, to a given EntityID. In an exemplary embodiment, the event value can monotonically increase. In some exemplary embodiments, stream computing program 102 can assign the identifiers to the event at the ingress point. In an exemplary embodiment, the event include separate mini-batches, such as mini-batch 201. In an exemplary embodiment, stream computing program 102 can logically model the mini-batches as a fault tolerant immutable, partitioned collection of elements. Mini-batch 201 includes one or more partitions, such as P1 202 and P2 203. A partition, such as P1, includes multiple records. In an exemplary embodiment, stream computing program 102, utilizing an ingress system, such as driver 104, can dispatch each partition to a specific compute node 110, such as compute node 1, via network 106. In some exemplary embodiments, stream computing program 102 can push the partitions to one or more compute nodes 110 using the logic of the partitioning scheme such as a key-range, hash function based partition, directory, or using the underlying distributed system.

In some exemplary embodiments, storage database 300 can be a key value store. The key value store can include three columns, table 302, key 304, and payload 306. Table 302 includes three tables, counters table 308, streams table 309, and events table 310. Counters table 308 includes EntityID in key column 304 and EventID in payload column 306. Streams table 309 includes minibatchID and paritionID in key column 304 and Dummy Payload in payload column 306. Events table 310 includes minibatchID, paritionID, and EntityID in key column 304 and a set of EventID in payload column 306.

Figure 4:
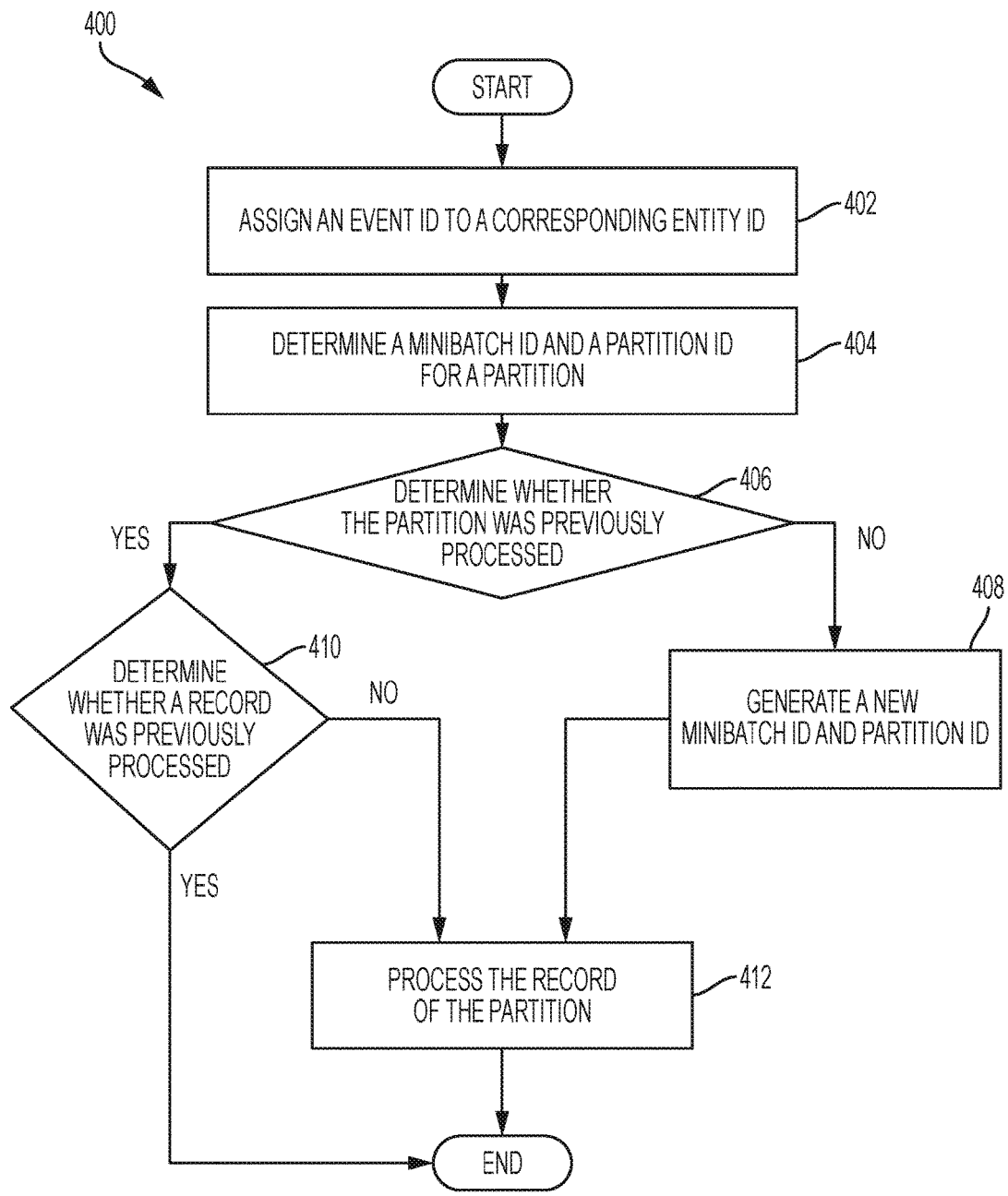
FIG. 4 is a flowchart illustrating operational steps of a stream computing program (such as the stream computing program of FIG. 1), according to an exemplary embodiment.

FIG. 4 is a flowchart illustrating operational steps of a stream computing program 102, generally designated 400, to detect fault-tolerance roll-backs in distributed data set partitions and to determine which elements in the partition should not be processed to avoid replaying a non-idempotent action, according to an exemplary embodiment. In some exemplary embodiments, stream computing program 102 receives minibatches of events. Driver 104 dispatches each partition to a specific compute node 110. For example, stream computing program 102 received a minibatch with a minibatchID of 3. Driver 104 dispatches a partition, such as P2 203, of the minibatch to compute node 2.

Responsive to dispatching each partition of a minibatch, stream computing program 102, utilizing driver 104, assigns an EventID to a corresponding EntityID (402). In some exemplary embodiments, driver 104 monotonically increases the EventID value at the point of ingress for each event that is received during the processing period. In another exemplary embodiment, driver 104 can assign the EventID before the stream of partitions enter the system. In yet another exemplary embodiment, driver 104 can assign the EventID after the stream of partitions enter the system. Driver 104 stores the EntityID in the key column 304 of storage database 300. Driver 104 stores the one or more EventIDs in the payload column 306 corresponding to the EntityID. For example, stream computing program 102 may assign a value of 1 to a user of Client 1 as the user's EntityID. The user may make one or more purchases on a retailer's website. For each purchase, Driver 104 receives these purchases in minibatch. Driver 104 assigns a monotonically increasing value as an EventID for each purchase. For example, Driver 104 assigns purchase 1 an EventID of 1000, purchase 2 is assigned an EventID of 1001, and purchase 3 is assigned an EventID of 1002. Driver 104 stores (1, 1000), (1, 1001), and (1, 1002) in the respective key column 304 and payload column 306 of counters table 308.

Stream computing program 102, utilizing Driver 104, determines a minibatchID and a partitionID for a partition (404). In an exemplary embodiment, driver 104 generates a minibatchID and a partitionID using partition metadata. In an exemplary embodiment, Driver 104 determines the minibatchID and partitionID before processing any records of the partition. For example, Driver 104 determines the dispatched P2 to compute node 2 has a partitionID of 2 and is from a minibatch with a minibatchID of 2. Driver 104 writes a record of (3, 2) to key column 304 and provides a dummy payload to payload column 306 in streams table 309.

Stream computing program 102, utilizing a compute node 110, begins processing the partition for a duration of time. For example, compute node 2 begins processing records of P2 for a ten minute period. Compute node 2 experiences a power failure three minutes into computation, and compute node 2 is unable to process the remaining records. Driver 104 reassigns P2 to another compute node, such as compute node 1, to re-process P2 from the beginning of the record.

Responsive to a experiencing a fault in the computation of a partition, driver 104 determines whether the partition was previously processed (decision block 406). In an exemplary embodiment, driver 104 determines if the partition was previously processed by locating a match of the minibatchID and partitionID in the key column 304 of the streams table 309 to the minibatchID and partitionID of the partition that driver reassigned. If driver 104 determines the partition was not previously processed (decision block 406, "NO" branch), driver 104 generates a new minibatchID and partitionID (408) and compute node 110 processes the record of the partition (412). In an exemplary embodiment, driver 104 generates a new minbatchID and partitionID for that partition. Driver 104 writes the new minbatchID and partitionID to key column 304 and provides a dummy payload to payload column 306 in streams table 309.

If driver 104 determines the partition was previously processed (decision block 406, "YES" branch), driver 104 determines whether a record was previously processed (decision block 410). In an exemplary embodiment, driver 104 determines whether a record was previously processed by locating a match of the minibatchID, partitionID, and entityID in the key column 304 of the events table 310 and a set of EventIDs in the payload column 306 to the minibatchID, partitionID, entityID, and set of EventIDs for the partition that Driver 104 reassigned. If Driver 104 determines a compute node 110 previously processed the record (decision block 410, "YES" branch), stream computing program 102 ends. For example, P2 may have a minibatchID equal to 2, a partitionID equal to 2, an entityID equal to 1 (i.e. (2,2,1)) and P2 may also have a set of EventIDs (e.g. 1000, 1001, 1002) assigned to their respective entityID (e.g. 1). Driver 104 may locate in the Events table 310 a record containing a minibatchID equal to 2, a partitionID equal to 2, an entityID equal to 1 and a set of EventIDs (e.g. 1000, 1001). Driver 104 determines a compute node 110 previously processed the record containing EventIDs 1000 and 1001, and compute node 1 does not process EventIDs 1000 and 1001 to avoid duplicate input and output data.

If driver 104 determines a compute node 110 did not previously process the record (decision block 410, "NO" branch), compute node 110 processes the record of the partition (412) and ends. For example, if driver 104 determines a compute node 110 did not previously process the record containing EventID 1002, compute node 110 processes EventID 1002. In an exemplary embodiment, driver 104 writes this record to events table 310.

Although the subject matter has been described in terms of exemplary embodiments, it is not limited thereto. Rather, the appended claims should be construed broadly, to include other variants and exemplary embodiments, which may be made by those skilled in the art without departing from the scope and range of equivalents of the subject matter.

What is claimed is:

1. A distributed stream computing method in non-idempotent output operations, implemented by one or more processors, the method comprising:
assigning an eventID to a corresponding entityID,
determining a minibatchID and a partitionID for a partition;
determining whether the partition was previously processed;
generating a new minibatchID and a new partitionID for a new partition based upon determining the partition was not previously processed;
determining whether a record was previously processed, based upon determining the partition was previously processed, by locating a match of the minibatchID, partitionID, and entityID in a key column of an events table and set of EventIDs in a payload column of the events table to the minibatchID, partitionID, entityID, and set of EventIDs for the partition; and
processing the record of the partition based upon determining the record was not previously processed.

2. The method of claim 1, wherein the generating the new minibatchID and the new partitionID for the new partition based upon determining the partition was not previously processed further comprises processing the record of the new partition.

3. The method of claim 2, wherein the method further comprises storing the new minibatchID and the new paritionID in a key column of a streams table and providing a dummy payload in a payload column of the streams table.

4. The method of claim 1, wherein the eventID comprises a monotonically increasing event value.

5. The method of claim 1, wherein the assigning the eventID to the corresponding entityID further comprises storing the entityID in a key column of a counters table and storing the eventID in a payload column of the counters table of the corresponding to the entityID.

6. The method of claim 1, wherein the determining whether the partition was previously processed comprises locating a match of the minibatchID and partitionID in a key column of a streams table to the minibatchID and partitionID of the partition.

7. A distributed stream computing apparatus in non-idempotent output operations, the apparatus comprising:
- at least one memory operable to store program instructions;
- at least one processor operable to read the stored program instructions; and
- according to the stored program instructions, the at least one processor is configured to be operated as:
  - a driver configured to assign an eventID to a corresponding identityID, to determine a minibatchID and a partitionID for a partition, to determine whether the partition was previously processed, to generate a new minibatchID and a new partitionID for a new partition based upon determining the partition was not previously processed, and to determine whether a record was previously processed, based upon determining the partition was previously processed, by locating a match of the minibatchID, partitionID, and entityID in a key column of an events table and a set of EventIDs in a payload column of the events table to the minibatchID, partitionID, entityID, and set of EventIDs for the partition; and
  - one or more compute nodes configured to process the record of the partition based upon the driver determining the record was not previously processed.

8. The apparatus of claim 7, wherein based on the driver generating the new minibatchID and the new partitionID for the new partition based upon determining the partition was not previously processed, the one or more compute nodes are further configured to process the record of the new partition.

9. The apparatus of claim 8, wherein the driver is further configured to store the new minibatchID and the new paritionID in a key column of a streams table and to provide a dummy payload in a payload column of the streams table.

10. The apparatus of claim 7, wherein the eventID comprises a monotonically increasing event value.

11. The apparatus of claim 7, wherein the driver, being configured to assign the eventID to the corresponding entityID, is further configured to store the entityID in a key column of a counters table and to store the eventID in a payload column of the counters table of the corresponding to the entityID.

12. The apparatus of claim 7, wherein the driver, being configured to determine whether the partition was previously processed, is further configured to locate a match of the minibatchID and partitionID in a key column of a streams table to the minibatchID and partitionID of the partition.

13. The apparatus of claim 7, wherein the eventID is a unique value assigned to an event, across the one or more compute nodes, for the entityID.

14. The apparatus of claim 7, wherein the entityID is a unique value that identifies an associated entity or user associated with an event.

15. The apparatus of claim 7, wherein a distributed dataset is divided into a plurality of partitions, the partition being one of the plurality of partitions.

16. A non-transitory computer readable storage medium, implemented by one or more processors, storing a traffic segmentation program for causing a computer to function as:
- a driver configured to assign an eventID to a corresponding entityID, wherein the eventID comprises a monotonically increasing event value, to determine a minibatchID and a partitionID for a partition, to determine whether the partition was previously processed, to generate a new minibatchID and a new partitionID for a new partition based upon determining the partition was not previously processed, and to determine whether a record was previously processed, based upon determining the partition was previously processed, by locating a match of the minibatchID, partitionID, and entityID in a key column of an events table and a set of EventIDs in a payload column of the events table to the minibatchID, partitionID, entityID, and set of EventIDs for the partition; and
- one or more compute nodes configured to process the record of the partition based upon the driver determining the record was not previously processed.

17. The non-transitory computer readable storage medium of claim 16, wherein based on the driver generating the new minibatchID and the new partitionID for the new partition based upon determining the partition was not previously processed, the one or more compute nodes are further configured to process the record of the new partition.

18. The non-transitory computer readable storage medium of claim 17, wherein the driver is further configured to store the new minibatchID and the new paritionID in a key column of a streams table and to provide a dummy payload in a payload column of the streams table.

19. The non-transitory computer readable storage medium of claim 16, wherein the driver, being configured to assign the eventID to the corresponding entityID, is further configured to store the entityID in a key column of a counters table and to store the eventID in a payload column of the counters table of the corresponding to the entityID.

20. The non-transitory computer readable storage medium of claim 16, wherein the driver, being configured to determine whether the partition was previously processed, is further configured to locate a match of the minibatchID and partitionID in a key column of a streams table to the minibatchID and partitionID of the partition.

* * * * *